(12) United States Patent
Kessel et al.

(10) Patent No.: US 12,370,896 B1
(45) Date of Patent: Jul. 29, 2025

(54) DUAL SOURCE BATTERY LOCOMOTIVE AND DUAL SOURCE BATTERY TENDER

(71) Applicant: VOLTIFY INC, Philadelphia, PA (US)

(72) Inventors: Alon Kessel, Ramat Gan (IL); Lea Kessel, Kfar Saba (IL)

(73) Assignee: VOLTIFY INC, Philadelphia, PA (US)

( * ) Notice: Subject to any disclaimer, the term of this patent is extended or adjusted under 35 U.S.C. 154(b) by 0 days.

(21) Appl. No.: 19/011,706

(22) Filed: Jan. 7, 2025

(51) Int. Cl.
  *B60L 5/38* (2006.01)
  *B61C 9/38* (2006.01)
  *B61C 17/06* (2006.01)
  *B61L 27/04* (2006.01)

(52) U.S. Cl.
  CPC .................. *B60L 5/38* (2013.01); *B61C 9/38* (2013.01); *B61C 17/06* (2013.01); *B61L 27/04* (2013.01)

(58) Field of Classification Search
  CPC ... B60L 5/38; B61C 9/38; B61C 17/06; B61L 27/04
  See application file for complete search history.

(56) References Cited

U.S. PATENT DOCUMENTS

2022/0024496 A1\* 1/2022 Havet ...................... B60L 5/20

FOREIGN PATENT DOCUMENTS

WO   WO-2022178006 A1 \*  8/2022  ............. B60G 11/56

\* cited by examiner

*Primary Examiner* — Robert J McCarry, Jr.
(74) *Attorney, Agent, or Firm* — The Roy Gross Law Firm, LLC; Roy D. Gross

(57) ABSTRACT

The present invention refers presents a method of converting a on the shelf battery container to a dual source battery locomotive or a dual source battery tender and a system thereof configured to operate even if there is a malfunction in one of the energy sources.

19 Claims, 5 Drawing Sheets

| Battery container 120-A | Battery container 120-B | TRACTION MOTORS | DC-DC 230-A | DC-DC 230-B | A | A1 | B | B1 | C | D | E | F | G | I | K | L | O | N | P |
|---|---|---|---|---|---|---|---|---|---|---|---|---|---|---|---|---|---|---|---|
| CHARGING | CHARGING | IDLE | charging battery container 120-A | charging battery container 120-B | close | close | close | open | open | open | close | open | open | open | open | open | open | open | close |
| CHARGING | DISCHARGING | POWER SUPPLY BY CONTAINER B | charging battery container 120-A | converting power for traction | close | close | close | open | open | open | close | open | open | open | open | close | close | open | open |
| DISCHARGING | CHARGING | POWER SUPPLY BY CONTAINER A | converting power for traction | charging battery container 120-B | close | close | close | open | close | close | open | close | open | open | open | open | open | close | close |
| discharge | shutdown | POWER SUPPLY BY CONTAINER A | converting power for traction | shut down | close | close | open | open | close | open | open | close | open | open | open | open | open | open | open |
| shutdown | discharge | POWER SUPPLY BY CONTAINER B | shut down | converting power for traction | open | open | close | open | open | open | close | open | open | open | open | close | open | close | open |
| discharging | discharging | POWER SUPPLY BY CONTAINER B+A | converting power for traction | converting power for traction | close | close | close | open | close | open | close | open | open | open | open | close | open | close | open |

Figure 4

DUAL SOURCE BATTERY LOCOMOTIVE AND DUAL SOURCE BATTERY TENDER

FIELD OF THE INVENTION

The present invention is in the field of method or system of a dual source battery locomotive and a dual source battery tender.

BACKGROUND OF THE INVENTION

The transition to sustainable transportation is a critical component of global efforts to mitigate climate change and reduce dependency on fossil fuels. Railways, particularly diesel-based systems, contribute significantly to greenhouse gas emissions, necessitating innovative solutions for decarbonization. Among these, the deployment of rolling stock equipped with energy storage systems presents a promising avenue.

A particularly viable approach within this paradigm is the segmental charging system, wherein rolling stock operates primarily on energy stored in onboard batteries. This system enables the train to traverse the majority of its route without relying on direct power supply, instead recharging dynamically within designated track segments. Such a configuration reduces the reliance on continuous electrification infrastructure, which is often costly and logistically challenging to implement, especially in remote or low-density regions.

To ensure the widespread adoption and effectiveness of battery-powered rolling stock, two critical factors must be addressed: resilience and cost-effectiveness. Resilience refers to the rolling stock's ability to maintain operational reliability under varying conditions, such as extreme weather, fluctuating energy demands, and diverse route profiles. This attribute is essential for gaining the confidence of operators and passengers alike.

Furthermore, the cost dynamics of battery rolling stock are influenced not only by the initial investment but also by their adaptability to emerging battery technologies. With rapid advancements in battery efficiency, lifespan, and energy density, the ability of rolling stock systems to seamlessly integrate new battery solutions ensures both long-term viability and competitive operating costs.

Therefore, there is eminent need for a, rolling stock equipped with advanced energy storage systems, segmental charging mechanisms, including any combination thereof, to enable decarbonization of rail networks worldwide.

SUMMARY OF THE INVENTION

It is hence an object of the invention to disclose a method for creating a dual source battery locomotive or a dual source battery tender, the method comprising (i) providing a battery locomotive or a battery tender; (ii) providing two energy storage system (ESS) configured to supply energy to propulsion power, auxiliary power, or third party, including any combination thereof; (iii) providing a control container; and (iv) connecting the at least one battery container to the locomotive or tender thereby obtaining the dual source battery locomotive or dual source battery tender; wherein the control container comprises an energy management (EMS) configured to (a) manage energy flow between power supply, each battery, auxiliary system, traction motor and DC-DC converters; (b) manage how electrical power is transformed from one form to another; and (c) monitor state of charge and health of each battery container in real-time.

In some embodiments, the two ESS are configured to work simultaneously as one unified system, or separately.

In some embodiments, the dual source battery locomotive is capable of simultaneously charging one of its ESS and discharging the other.

In some embodiments, the EMS is configured to manage separately and simultaneously each ESS.

In some embodiments, the two ESS are characterized by two different battery chemistry.

In some embodiments, the ESS comprises an off the shelf battery container.

In some embodiments, the dual source battery locomotive is further connectable to at least one dual source battery tender.

In some embodiments, the at least one dual source battery tender is connected in series.

In some embodiments, energy flow of at least one dual source battery tender is controlled by the dual source battery locomotive EMS.

In some embodiments, the dual source battery locomotive, dual source batter tender, or both reduce greenhouse gas emission.

It is hence another object of the invention to disclose an electrical system of a dual source rolling stock, comprising: a dual source battery locomotive comprising two energy storage system (ESS) configured to independently supply power; and a control container; wherein the control container comprises an energy management (EMS) configured to (i) manage energy flow between power supply, ESS, auxiliary system, traction motor and DC-DC converters, at any given time of a given ride; (ii) manage functionality of the two ESS; (iii) manage transformation of electrical power from one form to another; (iv) manage discharging, discharging or both of the ESS.

In some embodiments, the ESS are configured to work simultaneously as one unified system, or separately.

In some embodiments, the ESS are configured to charge the battery, discharge power to a load, or both.

In some embodiments, charging and discharging of the dual source battery locomotive and dual source battery tender is controlled by the dual source battery locomotive EMS.

In some embodiments, the two ESS are characterized by different battery chemistry.

In some embodiments, the ESS is configured to supply power to the dual source battery locomotive, the secondary system, or third party, including any combination thereof.

In some embodiments, the dual source battery locomotive is further connectable to at least one dual source battery tender, the at least one dual source battery tender is connected in series.

In some embodiments, the energy flow of the at least one dual source battery tender is controlled by the dual source battery locomotive EMS.

In some embodiments, the dual source battery locomotive, dual source battery tender, or both reduce greenhouse gas emission.

It is hence another object of the invention to disclose a method for creating a dual source battery locomotive comprising providing an off-the shelf battery container; providing an at least one vibration isolators; and placing the vibration isolators between rail car and train platform.

BRIEF DESCRIPTION OF THE DRAWINGS

The presently disclosed subject matter may be more clearly understood upon reading in the following detailed description embodiments of non-limiting exemplary embodiments thereof, with reference to the drawings.

Dimensions of components and features shown in the figures are chosen for convenience or clarity of presentation and are not necessarily shown to scale. Wherever possible, the same reference numbers will be used throughout the drawings and the following description to refer to the same and like parts:

FIG. 4 presents operation modes of a dual source battery locomotive, employing an energy management configuration, according to some embodiments of the present invention.

DETAILED DESCRIPTION OF THE PREFERRED EMBODIMENTS

Figure 1:
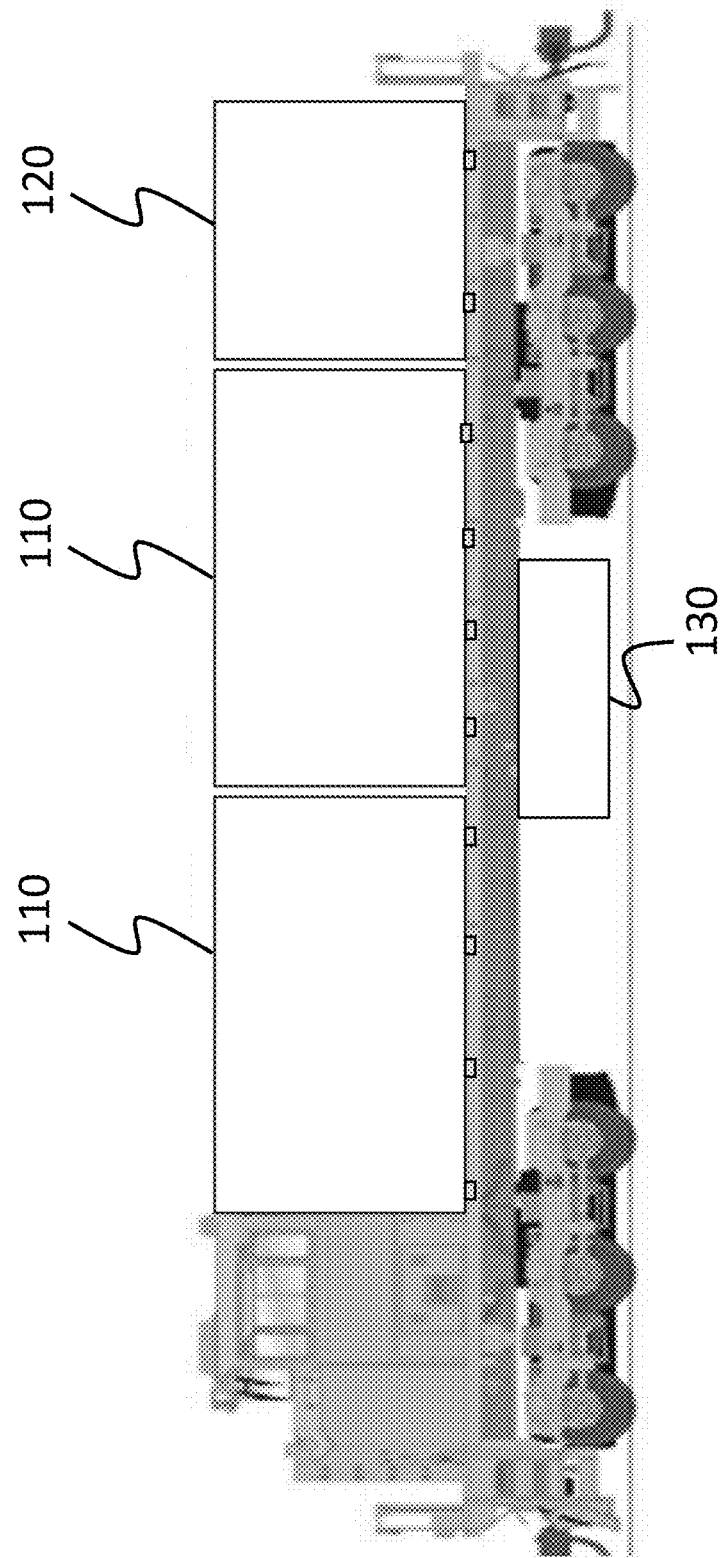
FIG. 1 presents an illustration of a dual source battery locomotive according to some embodiments of the present invention.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be limiting.

Further embodiments and the full scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

As used herein, the term "train", "rolling stock", and "locomotive" are used interchangeably and refer in a non-limiting manner to one or several rail-connected vehicles and/or road, trail, cable, support or path-constrained vehicle, including e.g., manned or unmanned vehicle, automatic or non-autonomous vehicle, which may include railroad vehicles of the present invention, that are capable of being moved together along a guideway, such as rail tracks, a railway, a rail line, a commuter line, to transport freight and/or passengers and a freight line (any one of which may be a train that rolls, or a train that is magnetically levitated). While a train generally includes one or more locomotives to provide power for traction. The terms may be used here to mean a vehicle that moves along a rail, a vehicle that moves along a guideway as in a maglev train system, or a wheeled vehicle that must follow a catenary in order to receive electric power from the catenary for powering the vehicle.

As used herein, the term "battery tender" refers to a device or system used to maintain and charge the batteries that power essential onboard systems.

In some embodiments, the rail system comprises at least one of the following elements: spur tracks, tracks, platforms, stations, signaling systems, switches and crossings, yards, bridges and tunnels, catenary system, or control centers, including any combination thereof. In some embodiments, the catenary system provides electrical power to the train. In some embodiments, the spur tracks refer to a rail road track that is branched off form a main.

As used herein the term "direct current (DC)" refers to unidirectional flow of electric charge, typically produced by sources such as batteries, solar cells, or DC generators. In direct current, electrons move consistently in a single direction through a conductor, as opposed to alternating current (AC), where the flow of electrons periodically reverses direction.

As used herein, the term "power source" refers to any system, material, or mechanism that provides energy to generate electricity, or fuel various processes. Power sources convert the energy obtained in different forms such as thermal, electrical, chemical, or mechanical, into usable energy for industries, homes, and devices. Two types of power source are commonly used today used, renewable energy sources and non-renewable energy source. Renewable energy source are energy sources that are replenished naturally and are typically more environmentally friendly because they do not emit greenhouse gases or pollutants during operation. Non-limiting examples of renewable energy sources include but are not limited to solar power, wind power, hydropower, geothermal energy, or biomass, including any combination thereof. Non-renewable energy sources do not replenish on a human timescale. Non-limiting examples for non-renewable energy sources include but are not limited to fossil fuels and nuclear energy. In some embodiments, the power source can be a dedicated power source, a nondedicated grid connection, or both.

According to one aspect of the present invention, there is provided a method for converting a locomotive to a dual source battery locomotive comprising (i) providing a locomotive; (ii) providing an at least one energy storage system (ESS) (iii) providing a control container; and (iii) connecting the at least one ESS to the locomotive thereby obtaining a dual source battery locomotive; wherein the control container comprises of an energy management system (EMS) and DC-DC converters. In some embodiments, the locomotive is an off the shelf battery tender.

Reference is now made to FIG. 1, an illustration representing a general layout of a dual source battery locomotive according to some embodiments of the present invention. Battery locomotive 100 comprises two energy storage systems 110, a control container 120, and 130 other components that can be positioned underneath the locomotive main structure. Control container 120 comprises of DC-DC convertors and an EMS. Non-limiting examples of other components include but are not limited to air reservoir or a compressor, including any combination thereof. As used herein, the terms "battery container" and "energy storage system, (ESS)" are used interchangeably.

As used herein, the term "energy management system (EMS)" refer to a system configured to manage all of energy flow between external power source, ESS, auxiliary system, and traction motors in a train, by controlling the DC-DC convertors of the battery locomotive and contactors. In some embodiments, EMS is designed to hold and manage electrical energy for locomotive propulsion and auxiliary systems. A person skilled in the art would appreciate that by DC-DC converters and the contactors the power flow between the power source, energy storage system, the traction motors, or any combination thereof, is controlled.

In some embodiments, the EMS is configured to (i) control the energy flow between power supply, each battery container, auxiliary system, traction motors, contactors or DC-DC convertors, including any combination thereof, thereby enabling each ESS to function separately or to function as a unified storage system; (ii) configured to monitor state of charge and health of each battery container in real-time; (iii) manage how electrical power is transformed from one form to another, (iv) switch between the plurality of battery containers, or (v) optimize energy efficiency and ESS life cycles, including any combination thereof.

A person skilled in the art would appreciate that high depth of charge (DOD) causes higher degradation of the battery. An example for EMS ability to optimize ESS life cycle could be if one of the battery containers reaches 10% and the other is at 50%, the EMS can order the transfer of energy from the second battery container to the first, to prevent the first battery container to reach a high DED.

In some embodiments, the EMS comprises an at least one sensors and communication protocols to detect anomalous conditions within individual battery cells or modules, triggering alerts or disconnects as safeguarded by automatic circuitry. A person skilled in the art would appreciate that the EMS can selectively enable charging or discharging from the most efficient battery under given conditions, utilizing various battery chemistries' characteristics for optimized energy management.

As used herein the term "energy storage system (ESS)" refers to a system configured to store and manage energy for future use. Typically, an ESS comprises a control system (battery management system), (BMS) configured to manage the charging, discharging and energy flow, battery, container, thermal management system, a power conversion system and a monitoring, or communication system, including any combination thereof.

In some embodiments, the BMS is configured to monitor state of charge and health of each battery container in real-time. In some embodiments, the BMS is configured to ensure the ESS operates according to a design range. In some embodiments, BMS is configured to monitor cell voltage, current, temperature and to estimate the cell charge and health.

As used herein, the term "battery container" is an enclosure designed to house and protect batteries used in energy storage systems or vehicles like electric trains, cars, or stationary power systems. It serves multiple purposes, including physical protection, thermal management, electrical safety, and ease of maintenance. the nominal voltage range of a battery container can vary widely, typically from 900V to 1,500V, depending on its design and intended application.

In some embodiments, the battery container is characterized by a voltage range between 1000 and 1500V. A person skilled in the art would appreciate that the voltage of a battery container is directly related to the state of charge (SOC) of the battery. As the SOC changes, the voltage fluctuates, providing an indicator of how much energy remains in the battery. A fully charged battery typically exhibits its maximum voltage, while a discharged battery shows a significantly lower voltage. This relationship is influenced by the battery chemistry, load conditions, and temperature. Monitoring voltage is a common method for estimating SOC, although it may require calibration for accuracy, especially under varying operating conditions.

In some embodiments, the battery containers and control containers are secured to locomotive frame. A person skilled in the art would appreciate that securing a container to a train involves a combination of mechanical locks, tensioning systems, railcar design features, and safety equipment to ensure the container remains stable and intact during transportation. The specific method used depends on the type of container, train system, and the cargo being transported. In some embodiments, the securing is by at least four vibration isolators.

In some embodiments, a dual source battery locomotive comprises a plurality of ESS. The term "plurality" the state of being multiple or consisting of more than one. For example, a plurality of ESS refers to at least two ESSs.

In some embodiments, the ESS is configured to supply power to the dual source battery locomotive, the secondary system, or third party, including any combination thereof. In some embodiments, the third party is or comprises the additional ESS. For example: one of the ESS is discharged in order to charge the second ESS within the dual source battery locomotive.

In some embodiments, the plurality of ESS is configured to charge a battery, discharge power to a load, or both. In some embodiments, the load is or comprises, an ESS, traction motors, or auxiliary system, including any combination thereof. In some embodiments, charging is by supplying power from a power source to the battery and discharging is by supplying energy from the battery to a load. In some embodiments, the power source is an external power source, internal power source, or both. In some embodiments, internal power source is or comprises the additional ESS.

As used herein, the term "load" refers to any device, appliance, or system that consumes electrical power. It is the component or part of an electrical circuit that uses energy to perform a function, such as lighting a room, powering a motor, or running an electronic device. Non-limiting examples of loads include but are not limited to a microgrid, an energy storing system, an auxiliary system, or any combination thereof.

As used herein, the term "auxiliary system" refers to a secondary system that supports the primary function of a larger system, providing necessary functions or services to ensure optimal operation, safety, and efficiency. In the context of trains auxiliary systems are those that are not directly involved in the main operation but are crucial for the overall functioning and safety, for example air condition.

In some embodiments, charging of the battery is by at least two power sources. In some embodiments, the at least two power sources are characterized by different voltages or different battery chemistry. As used herein, the term "battery chemistry" refers to the materials and electrochemical reactions that store and release energy in a battery. Different chemistries require different charging strategies.

As used herein, the term "design range" refers to the operational limits and specifications it is engineered to meet under normal conditions, ensuring safety, reliability, and efficiency. Non-limiting examples of operational limits include but are not limited to speed range, defining the minimum and maximum safe operating speeds, and power range, determining the propulsion system's capacity to handle varying terrains and loads, environmental factors like operational temperature limits, track gradients, and curvature the train can navigate, as well as its weight and load capacity, or braking performance and suspension flexibility to manage track irregularities, ensuring the train performs effectively in diverse conditions including any combination thereof.

In some embodiments, the thermal management system is configured to monitor and maintain the battery temperature in its designated temperature range during operation. In some embodiments, is configured to transfer heat away from the battery.

In some embodiments, the battery locomotive further comprises a thermal management subsystem associated with each battery container. In some embodiments, the thermal management subsystem is configured to incorporate heat exchangers or liquid cooling circuits designed to maintain optimal operating temperatures for the batteries. In some embodiments, the thermal management is supported by the EMS's feedback control loop to maintain temperature within defined safety limits, thereby extending battery life and ensuring consistent performance.

As used herein, the term "thermal management system" refers to a system configured to monitor and maintain a battery surface within its designated temperature range. Thermal management in batteries is critical, as they generate heat due to internal resistance during operation. To maintain optimal performance and prevent overheating, it is essential to keep the battery surface within designated temperature range.

A person skilled in the art would appreciate that thermal management in batteries involve various techniques to ensure optimal performance and safety. Non-limiting examples include, but are not limited to, liquid cooling systems that transfer heat away from the batteries, air cooling using forced air or natural convection.

In some embodiments, the battery locomotive further comprises a regenerative braking system configured to capture kinetic energy during deceleration. In some embodiments, the captured energy is directed into the energy storage system for later use, enhancing overall energy efficiency. In some embodiments, the EMS is further configured to adjust the regenerative braking parameters based on the state of charge of each energy storage system, optimizing energy recovery and minimizing wear on mechanical braking components.

In some embodiments, the ESS further comprises a fire suppression system configured to detect fire. In some embodiments, fire suppression system is configured to designed to detect fires, control fires and ensure safety during operation. In some embodiments, the fire suppression system comprises of smoke detectors, heat detectors, flame detectors, gas-based suppression, water-based suppression, or ventilation control, including any combination thereof. in some embodiments the fire suppression system, is configured to localize the fire in specific compartment, thereby prevent the fire from spreading.

In some embodiments, the EMS is configured to manage energy flow between power source and locomotive propulsion system and manage how electrical power is transferred from one form to another. As used herein, the term "transferred from one form to another" refers to transfer direct current (DC) to alternative current (AC), from DC-DC, from AC to AC, or from AC to DC.

In some embodiments, the DC-DC convertors are configured to regulate voltage. In some embodiments, the charging and discharging of a battery is by DC-DC convertors. In some embodiments, the DC-DC convertors are configured to control the output voltage and current. In some embodiments, the DC-DC convertors define buck boost bidirectional converters. In some embodiments, each ESS is connected to DC-SC convertors.

As used herein, the term "DC-DC convertor" refers to an electronic device that converts DC from one voltage level to another. It is used to either increase or decrease the input voltage to meet the requirements of specific devices or systems. As used herein, the term 'buck-boost bi-directional converters' refers to a type of converter capable of stepping down the voltage when the input is higher than the required output and stepping up the voltage when the input is lower than the required output. This stepping up or stepping down can occur in either direction of the converter. In some embodiments, the DC-DC convertor are connected in parallel. A person skilled in the art would appreciate that a parallel connection of DC-DC convertors enables multiple lower power DC-DC convertors to perform as a one large-scale DC-DC convertor. The way the DC-DC convertors are connected, affects the total converting power.

As used herein, the term "contactor" refers to an electrically operated switch used for controlling a power circuit. It is activated by an electromagnetic coil, which closes or opens electrical contacts to control the flow of electricity.

In some embodiments, the EMS is connected to the contactors and the DC-DC convertors.

In some embodiments, the battery locomotive of the present invention is configured to use at least two independent power sources configured to work independently or as a unified system.

In some embodiments, the dual source battery locomotive of the present invention further comprises dynamic charging capabilities. As used herein the term "dynamic charging means" refer to the ability of a battery locomotive to charge while in move. Non-limiting examples of dynamic charging means include but are not limited to overhead electrification, third rail, inductive charging or regenerative braking, including any combination thereof. In some embodiments, dynamic charging means is or comprises an overhead electrification. In some embodiments, the overhead electrification is or comprises a pantograph.

In some embodiments, dynamic charging means comprise overhead electrification, third rail, or both. In some embodiments, dynamic charging means comprises an overhead electrification, a pantograph.

In some embodiments, dynamic charging means comprise an at least one dual source battery tender connected to the dual source of the present invention, configured to supply energy to the traction motors, ESS, auxiliary system, or any combination thereof.

Figure 2:
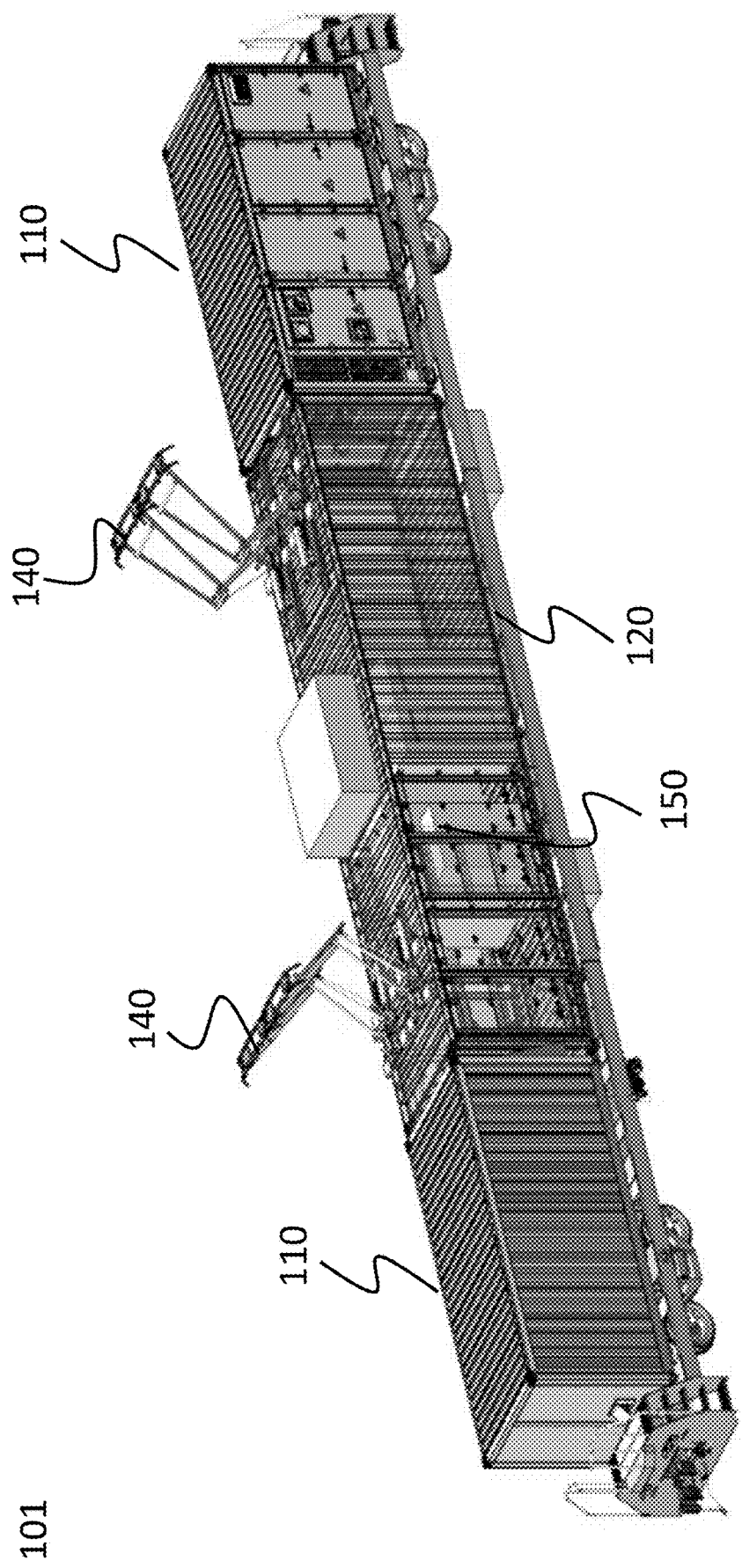
FIG. 2 illustrates a general layout of a dual source battery locomotive comprising dynamic charging capabilities according to some embodiments of the present invention.
Figure 3:
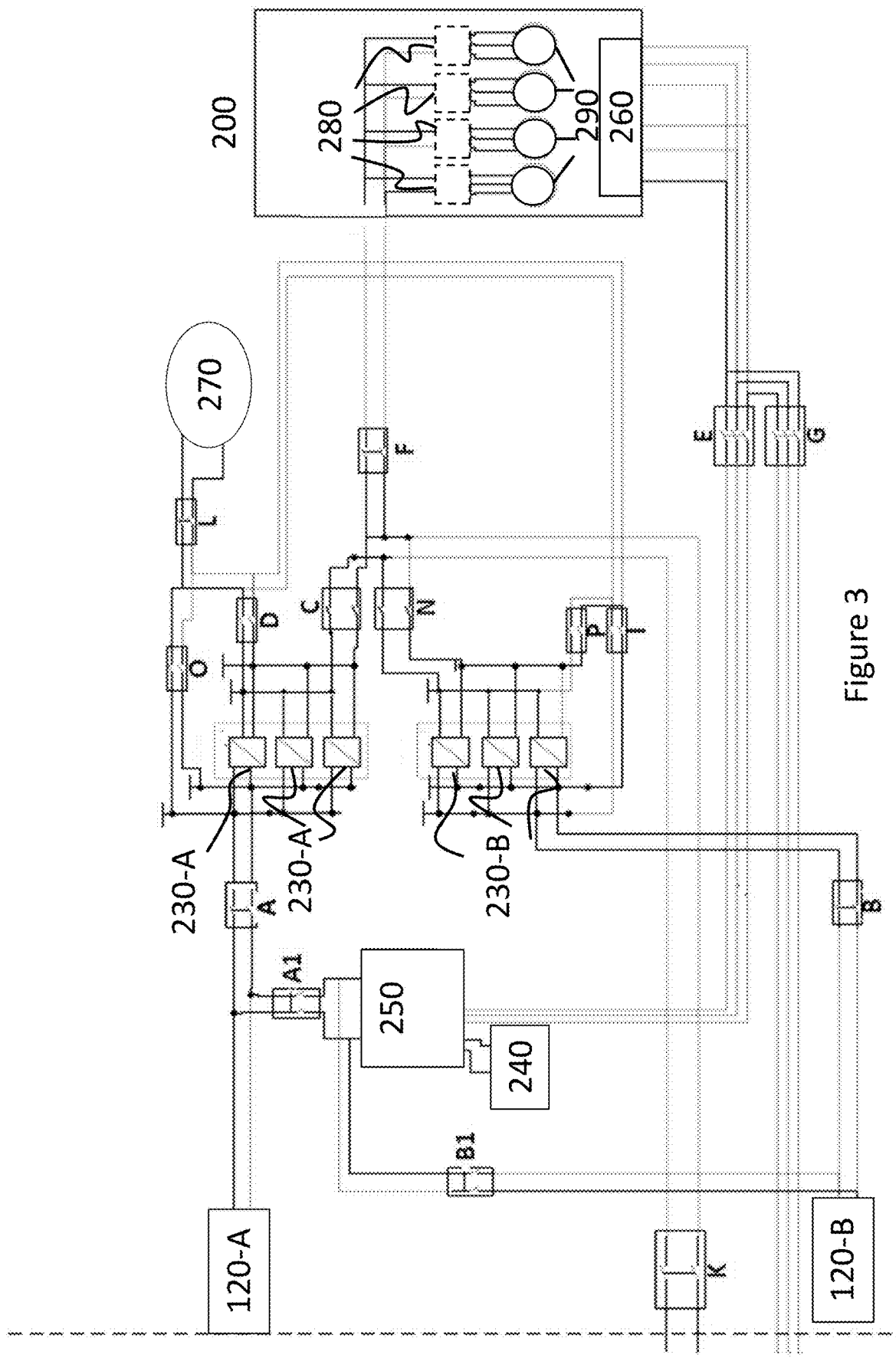
FIG. 3 a schematic diagram of an electrical system for dual source battery locomotive according to some embodiments of the present invention.

Reference is now made to FIG. 2 an illustration representing a general layout of a dual source battery locomotive comprising dynamic charging capabilities according to some embodiments of the present invention. Dual source battery locomotive 100 comprises two ESS 110, a control container 120, and 130 other components that can be positioned underneath the locomotive main structure. Control container 120 comprises of DC-DC convertors and an EMS 150. An overhead electrification, pantograph 140 is seen on the top of the control container. A person skilled in the art would appreciate that the location of the dynamic charging means defers based on the size of the train, the type of containers and the number of containers.

In some embodiments, the dynamic charging means is configured to link between the ESS and an external power source. In some embodiments, an external power source is or comprises renewable, non-renewable energy source, or any combination thereof. In some embodiment, non-renewable energy source is or comprises coil, oil, natural gas, or nuclear energy, including any combination thereof. In some embodiments, renewable energy source is or comprises, solar panels, wind turbines, or micro-hydropower, including any combination thereof.

In some embodiments, the dual source battery locomotive is simultaneously charged by two independent power sources. In some embodiments, each of the two power sources are independently selected from the group consisting of external source regenerative power, dual source battery tender, or plurality of ESSs, including any combination thereof. In some embodiments, the battery of a dual source battery locomotive is charged by the second ESS. In some embodiments, charging one ESS by a second ESS occurs is by discharging off while the second is charged.

In some embodiments, the two ESSs 110 use distinct battery chemistries. A person skilled in the art would appreciate that by using distinct battery chemistries enhances energy storage versatility and operational resilience. Distinct battery chemistries used in rolling stock include a variety of technologies, each suited to specific applications and performance requirements. Common examples are lithium-ion batteries, which encompass subtypes such as Lithium Iron Phosphate (LFP), Lithium Nickel Manganese Cobalt Oxide (NMC), and Lithium Titanate (LTO). Lead-acid batteries, or sodium ion batteries. The ability to combine two sort of technology on the same battery tender, enable flexibility in maintenance, for example, it enables the replacement of old malfunction battery container to be replaced with a newer technology. In some embodiments, the plurality of ESS positioned in a manner that allows effective energy management. In some embodiments, each ESS comprises an at least one vibration isolators configured to secure attachment of ESS with a train.

In some embodiments, the dual source battery locomotive comprises a propulsion system configured to control power supplied at any given time of a given ride to each traction motor. In some embodiments, the propulsion system is located towards the front section of a train. In some embodiments, the propulsion system utilizes two independent power sources. In some embodiment, the two independent power sources function both collaboratively and independently. A person skilled in the art would appreciate that would appreciate that this configuration provides operational resilience and flexibility, enabling continued functionality in case of a system malfunction.

As used herein, the term "propulsion system" refers to the mechanism that generates the force required to move the train forward (or backward) along the tracks. It encompasses the components and technologies responsible for converting energy into motion, including the power source, energy transmission, and drive mechanisms.

In some embodiments, the battery locomotive further comprises an at least one vibration isolator configured to secure the battery containers. In some embodiments, the vibration isolator is configured to minimizes mechanical vibration transmitted to the battery container, enhance the longevity and stability of the battery during operation.

As used herein, the term "vibration isolator" refers to a device designed to reduce or eliminate the transmission of vibrations between two structures or systems. It works by absorbing, dampening, or redirecting vibrational energy, thereby protecting sensitive equipment, structures, or individuals from the adverse effects of vibration. In trains, the vibration isolator helps maintain the integrity of the energy storage components while the train is in motion.

In some embodiments, the battery locomotive comprises an auxiliary system configured to control power supplied to secondary systems.

In some embodiments, the dual source battery locomotive of the present invention reduces greenhouse gas emission. A person skilled in the art would appreciates using batteries helps reduce greenhouse gas emissions by enabling cleaner energy generation, storage, and usage. Batteries support renewable energy sources like solar and wind by storing excess energy for use during low production periods, reducing reliance on fossil fuel-based power plants. In transportation, battery electric vehicles eliminate tailpipe emissions and significantly lower $CO_2$ output compared to internal combustion engine vehicles, especially when charged with renewable energy. Batteries improve energy efficiency by supporting grid stability, reducing the need for inefficient fossil fuel-powered "peaking" plants, and enabling microgrids and off-grid renewable energy solutions in remote areas. They also replace diesel generators in industrial applications, further cutting emissions.

According to one aspect of the present invention, there is provided a method for converting a locomotive to a battery locomotive comprising (i) providing a locomotive; (ii) providing an at least one energy storage system (ESS); (iii) a control container comprising an energy management (EMS); and (iii) connecting an at least one ESS to the locomotive thereby obtaining a battery locomotive; wherein the EMS is configured to manage energy flow between power source and locomotive propulsion system; and manage how electrical power is transformed from one form to another. In some embodiments, the battery locomotive further comprises a DC-DC convertor configured to regulate power flow.

According to one aspect of the present invention, there is provided an electrical system of a dual-source battery locomotive, comprising (i) a dual source battery locomotive; (ii) and a control container, wherein the control container comprises an EMS configured to (a) manage energy flow between power source and locomotive propulsion system, and (b) manage how electrical power is transformed from one form to another, and a DC-DC converters configured to regulate power flow between the energy storage system and traction motors.

In some embodiments, the dual battery locomotive comprises two independent ESSs, that at any given time are capable of transferring energy from one to the other, the traction motors, or auxiliary locomotive system, including any combination thereof. In some embodiments, transfer of energy from one ESS to another, enables charging of the first ESS while the second is discharged, or vice versa.

In some embodiments, the dual source battery locomotive comprises a propulsion system configured to use the at two independent power sources.

In some embodiments, the dual source battery locomotive comprises a first ESS utilizing one battery technology and a second ESS employing a different battery technology. In some embodiments, utilization of two distinct battery technologies enables optimization of energy density and discharge rates, facilitating efficient energy management based on route requirements or operational demands. In some embodiments, the EMS coordinates the interaction between these systems, ensuring optimal power distribution and switching between systems as necessary.

In some embodiments, the electric system further comprises a wireless communication capability to interact with grid operators or microgrid systems. A person skilled in the art would apricate that wireless communication capability enables the system to participate in demand response programs, where excess stored energy can be supplied back to the grid. In some embodiments, the EMS dynamically manages energy exchange based on current grid demands, rolling stock energy requirements, or economic incentives provided by energy markets.

Reference is now made to FIG. 4 presenting a scheme schematic diagram of an electrical system of a dual source battery locomotive, the electrical system integrates between an energy management system, and an energy storage system. The scheme outlines the arrangement of key components of the system. Dual source battery locomotive 200 comprises containers 120-A and 120-B representing battery container A and battery container B, respectively. Containers 120-A and 120-B serve as energy storage system providing power to the system, the locomotive (200) traction motors and auxiliary systems. 230-A and 230-B represent DC-DC converter of connected to battery container A and battery container B, respectively. 230-A and 230-B are configured to regulate power flow from the energy storage system to various functional units. The power regulation is managed by the EMS, 240. In some embodiments, EMS 240 is configured to manage energy distribution and operational logic.250 is an AC converter, configured to convert incoming power from alternate current sources to direct current, facilitating its integration into the system. 260 auxiliary systems such as blowers and air compressors. Dual source battery locomotive 200 receives electrical energy, if the electrical energy is DC it passes to the locomotive auxiliary system 260 and locomotive traction motors 290. If locomotive 200 traction motors work on AC battery locomotive will comprise an invertor, 280 configured to convert DC electrical energy to AC and transfer energy to locomotive auxiliary system 260 and locomotive traction motors 290. A person skilled in the art would appreciate that the auxiliary system 260 and traction motors 290 are connected and thus supported by two power sources, power source 270 and battery containers 120-A and 120-B. This enables both the auxiliary system and traction motors to continuously operate even if there is a malfunction in one of the power sources. In some embodiments, power source 270 is or comprises a pantograph. In some embodiments, the pantograph comprises electrical energy from a micro grid, an energy renewable source, or both. Pantograph 270 transfers electrical energy, to ESSs (battery containers 120-A and 120-B), locomotive traction motors, or auxiliary system, including any combination thereof.

The scheme presents two groups of three DC-DC convertors per battery container, this is merely an example. The invention is not limited to the number of convertors in each group. In some embodiments, each battery container is connected to an at least one DC-DC convertor. A person skilled in the art would appreciate that the amount of DC-DC convertor in each group depends on the desired power conversion capabilities required, and that each battery container is connected to a different DC-DC convertor configured to set the voltage transferred to and from the battery container.

A person skilled in the art would appreciate that at any given time the voltage of each battery within the battery containers differ according to its SOE, therefor (i) when electrical energy is transferred from energy source 270 to the battery containers, the at least one DC-DC convertor connected to each battery is configured to set the voltage to desired battery voltage; and (ii) when electrical energy is transferred from the battery containers to the locomotive traction motors, the at least one DC-DC convertors set the voltage transfered through to fit the voltage required by the traction motors.

FIG. 4 demonstrates how each component is interconnected to the other, how the electrical power can be split and changed from one voltage or type to another, thereby ensuring robust, flexible, and resilient railway operation.

Additionally, the schematic shows contactors A-P configured to connect between battery containers 120-A and 120-B through DC-DC converter 230-A and 230-B, ensuring energy flow continuity and dynamic charging capabilities during operation of the rolling stock. The diagram illustrates a comprehensive energy network capable of optimizing power usage, facilitating seamless operation irrespective of individual component failures. This integrated setup provides robust energy management across various operational scenarios, enhancing resilience and efficiency. In some embodiments, charging of the plurality of ESSs is by power source 270, one of the plurality of ESSs, or any combination thereof. Which power source charges each battery is controlled by EMS 250.

Figure 5:
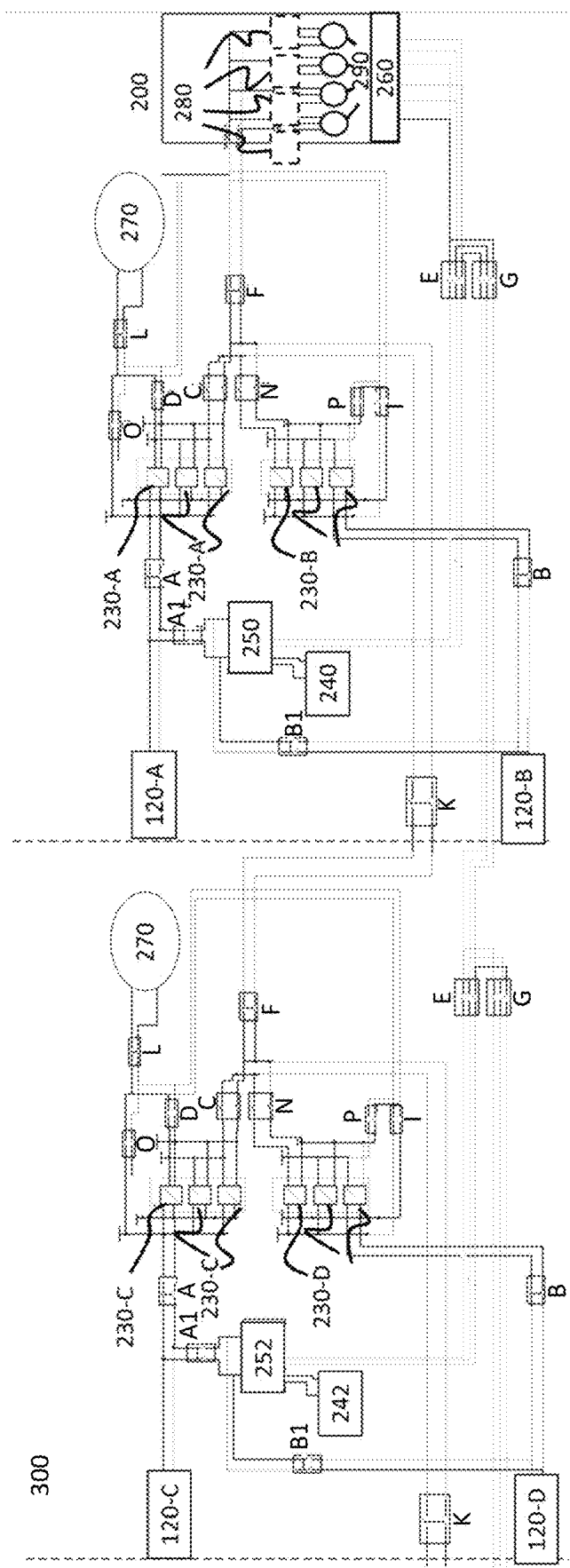
FIG. 5 a schematic representation of a dual source battery tender connected to a dual source battery locomotive according to some embodiments of the present invention.

Reference is now made to FIG. 5 presenting a schematic representation of the exemplary operation modes for a dual-system rolling stock employing an energy management configuration. The figure is organized as a table to illustrate various operational states and corresponding actions for battery container 130-A and battery container 120-B alongside the functions of traction motors 290, DC-DC converters 230A, and related components.

In some embodiments, the EMS is connected and in communication with all contactors and all DC-DC convertors, thereby controlling the power flow between the source, each battery propulsions system and auxiliary system. A person skilled in the art would appreciate that this communication enables better control system command, increase ability to handle different status, or enable functionally even if one of the plurality of ESS is faulty, including any combination thereof.

Battery container 120-A and battery container 120-B operate in distinct modes, including charging, and discharging. During the charging mode for battery container 120-A, EMS 240 engages contactor I to facilitate power supply to container 120-A, while contactor J directs power to container 120-B. The system coordinates with contactor F, locomotive 200, for energy distribution. Similarly, when discharging power supply from container 120-A and container 120-B to traction motors 290, the converters engage to regulate power flow. These procedures involve contactor G, the air compressor, and contactor H, another air compressor, ensuring efficient energy utilization.

Moreover, the role of EMS 240 is depicted through the control of DC-DC converters 230-A and 230-B, as well as managing the AC converter 280. In some embodiments, EMS 240 is configured to oversee operational logic. In some embodiments, the operational logic comprises converting power for traction motors 290 and charging battery containers 220-A and 220-B concurrently. The system uses communication links, including contactor N, to optimize performance and resilience. Power source contactor O is critically regulated to maintain consistent energy flow during variable operations, with the position denoted by contactor P indicating open states during necessary energy transitions.

A person skilled in the art would appreciate that the coordination between elements illustrates an integrated mechanism where different states are achieved through strategic control of electronic components, such as closing or opening specific pathways to achieve desired power flow dynamics. This structured methodology enhances functionality by allowing auxiliary components to resume or halt based on system requirements, thus providing a seamless operational framework for the rolling stock's energy system.

In some embodiments, the dual source locomotive further comprises an at least one dual source battery tender connected in series. In some embodiments, the at least one battery tender is configured to supply power during the ride, in large segments which devoid of charging. In some embodiments, the dual battery tender comprises two battery containers characterized by distinct battery chemistry. In some embodiments, the battery tender EMS is controlled by the battery locomotive EMS.

In some embodiments, the series connection enhances energy capacity. As used herein, the term "connected in series" refers to a setup where multiple energy storage units (such as batteries or capacitors) are linked together in a chain-like configuration. In a series connection, the positive terminal of one storage unit is connected to the negative terminal of the next, increasing the overall voltage of the system while maintaining the same current.

Reference is now made to FIG. 6 presenting a schematic representation of a dual source battery tender connected to a dual source battery locomotive. In this configuration, the main EMS, 250, manages the total energy flow. It manages the energy flow from all of the ESSs and dual source battery tender connected to the train. The train can comprise an at least one battery tender, and it can be located at any location through the train. The battery tender EMS 252, is in communication with EMS 250, the primary EMS of dual source battery locomotive 200. In some embodiments, EMS 250 controls when contactor K is closed or open, and thus controls when electrical energy passes from battery tender 300 to locomotive 200. This configuration and the ability to connect a plurality of battery tender to the train enable locomotive 200 to continue riding for large lengths without charging.

In some embodiments, the two ESS and the at least one dual source battery tender comprise the same components, therefor each can act as the primary container. In some embodiments, the primary EMS is configured to control the EMSs of the battery tender. In some embodiments, the ability to use at least one dual source battery tender enables a rolling stock to ride for great length without dynamically charging its ESS.

The configuration consists of multiple interconnected components designed for efficient power management and conversion. Battery container 120-A and battery container 120-B serve as the primary energy storage units, and battery containers 120-C and 120-D serve as secondary energy storage units and/or secondary power source. These containers are integrated into the system through connections that allow coordinated energy flow.

Dual source battery tender 300 is connected to facilitate the charging and discharging cycles between battery container 120-A and battery container 120-B during the ride, especially in urban places or remote places where charging is not possible. This setup enables dynamic energy transfer, from an internal power source, dual source battery tender 300, which is managed by the EMS 250. The EMS ensures optimal energy distribution across the system, maintaining operation efficiency and resilience.

DC-DC converter 230-A and 230-B regulate power flow between the ESS (battery containers 120-A and 120-B), traction motors 290, power source 270, locomotive auxiliary system 240, or to dual source battery tender 300 including any combination thereof. This converter plays a crucial role in adjusting the voltage levels to meet the operational requirements of the propulsion system. DC-DC 230-C and 230-C regulate power flow between battery container 120-C and 120-D, traction motors 290, power source 270, locomotive auxiliary system 240 or container 120-C and 120-D, including any combination thereof.

In some embodiments, the system further comprises an AC converter configured to handle conversion tasks when the rolling stock utilizes an external alternating current source for energy input, or the traction motors of the locomotive use AC.

Contactor G is connected to the overall system, providing required pneumatic power for auxiliary operations within the locomotive setup. This compressor enhances system functionality, particularly in scenarios requiring pressurized air.

The described configuration offers flexibility and resilience through its dual-battery system architecture, as illustrated by battery container 120-A and battery container 120-B operating in tandem. Each component is positioned to maximize energy efficiency and maintain continuous operation across varying power sources.

According to another aspect of the present invention there is disclosed a method for creating a dual source battery locomotive comprising (i) providing an off-the shelf battery container; (ii) providing an at least one vibration isolators; and placing the vibration isolators between rail car and train platform.

According to one aspect of the present invention, there is provided a method for converting a tender to a dual source battery tender comprising (i) providing a battery tender; (ii) providing an at least one energy storage system (ESS) (iii) providing a control container; and (iii) connecting the at least one ESS to the battery tender thereby obtaining a dual source battery tender; wherein the control container comprises of an energy management system (EMS) and DC-DC converters.

What we claimed is:
1. A method for creating a dual source energy storage system (ESS) motive battery unit (MBU), said method comprising
  providing MBU; said MBU comprising a battery locomotive or a battery tender;
  providing two ESSs separately controlled by an energy management (EMS), configured to supply energy to propulsion power, auxiliary power, or one of said two ESSs, including any combination thereof;
  providing and installing a control container in said battery locomotive; and
  connecting said two battery containers to said MBU thereby obtaining said dual source ESS MBU;
  said control container comprises said EMS;
  said EMS configured to
    communicate with all contactors, all DC-DC converters, and battery management system, thereby managing energy flow between power supply, each of said two ESS, auxiliary system, propulsion system, or all DC-DC converters, including any combination thereof;
    manage how electrical power is transformed from one form to another; and
    monitor state of charge and health of each battery container in real-time;
  wherein said dual source ESS is configured to
    simultaneously charge said two ESSs from; charging one from an electrification line and other from a regenerative power;

simultaneously charge one of said ESS and discharge the other;
discharge said two ESSs simultaneously to provide power to said auxiliary system and to traction motor;
discharge said two ESSs simultaneously while one ESS provides power to said auxiliary system and other ESS to said traction motor;
transfer energy from one ESS to another, to prevent the later from reaching its full discharge point; or
any combination thereof.

2. The method of claim 1, wherein said two ESS are configured to work simultaneously as one unified system, or separately.

3. The method of claim 1, wherein said EMS is configured to manage separately and simultaneously each ESS.

4. The method of claim 1, wherein said two ESS are characterized by two different battery chemistry.

5. The method of claim 1, wherein said ESS comprises an off the shelf battery container.

6. The method of claim 1, wherein said dual source ESS battery locomotive is further connectable to an at least one dual source ESS battery tender.

7. The method of claim 6, wherein said at least one dual source ESS battery tender is connected in series.

8. The method of claim 6, wherein energy flow of said at least one dual source ESS battery tender is controlled by said dual source ESS battery locomotive EMS.

9. The method of claim 1, wherein said dual source ESS MBU reduces greenhouse gas emission.

10. An electrical system of a dual source energy storage system (ESS) rolling stock, comprising:
a dual source ESS battery locomotive comprising two ESSs separately controlled by
an energy management (EMS) configured to independently supply power; and
a control container installed in said battery locomotive;
said control container comprises said EMS; said EMS is configured to
communicate with all contactors, and battery management system, thereby managing energy flow between power supply, each of said two ESS, auxiliary system, propulsion system or DC-DC converters, including any combination thereof, at any given time of a given ride;
manage functionality of said two ESSs;
manage transformation of electrical power from one form to another; and
manage discharging, discharging or both of said two ESS;
wherein said dual source ESS rolling stock is configured to
simultaneously charge said two ESSs from; charging one from an electrification line and other from a regenerative power;
simultaneously charge one of said ESS and discharge the other;
discharge said two ESSs simultaneously to provide power to said auxiliary system and to traction motor;
discharge said two ESSs simultaneously while one ESS provides power to said auxiliary system and other ESS to said traction motor;
transfer energy from one ESS to another, to prevent the later from reaching its full discharge point; or
any combination thereof.

11. The system of claim 10, wherein said two ESSs are configured to work simultaneously as one unified system, or separately.

12. The system of claim 10 wherein said two ESSs are configured to charge said battery, discharge power to a load, or both.

13. The system of claim 12, wherein charging and discharging of said dual source ESS battery locomotive is controlled by said dual source ESS battery locomotive EMS.

14. The system of claim 10, wherein said two ESS are characterized by two different battery chemistry.

15. The system of claim 10, wherein said ESS is configured to supply power to said dual source ESS battery locomotive, said secondary system, or third party, including any combination thereof.

16. The system of claim 10, wherein said dual source ESS battery locomotive is further connectable to a plurality of dual source ESS battery tender, said plurality of dual source battery tender is connected in series.

17. The system of claim 16, wherein energy flow of said plurality of dual source battery tender is controlled by said dual source ESS battery locomotive EMS.

18. The system of claim 10, wherein said dual source ESS battery locomotive, dual source battery tender, or both reduce greenhouse gas emission.

19. A method for creating a dual source ESS battery locomotive comprising
providing two off-the shelf battery container;
providing an at least one vibration isolators; and
placing said vibration isolators between said two off-the shelf battery container and a locomotive under frame;
wherein said dual source ESS battery locomotive is configured to
simultaneously charge said two ESSs from; charging one from an electrification line and other from a regenerative power;
simultaneously charge one of said ESS and discharge the other;
discharge said two ESSs simultaneously to provide power to said auxiliary system and to a traction motor;
discharge said two ESSs simultaneously while one ESS provides power to said auxiliary system and other ESS to said traction motor;
transfer energy from one ESS to another, to prevent the later from reaching its full discharge point; or
any combination thereof.

* * * * *